Patented Mar. 23, 1954

2,673,224

UNITED STATES PATENT OFFICE 2,673,224

ALKYLATION OF AROMATIC HYDROCARBONS BY ISOPARAFFINIC HYDROCARBONS

Robert M. Kennedy, Newtown Square, and Abraham Schneider, Philadelphia, Pa., assignors to Sun Oil Company, Philadelphia, Pa., a corporation of New Jersey No Drawing. Application December 16, 1949,
Serial No. 133,482

15 Claims. (Cl. 260—671)

This invention relates to a catalytic alkylation process, and more particularly to the alkylation of aromatics with isoparaffins under novel catalytic conditions.

Aromatics have heretofore been alkylated with paraffins or naphthenes by what is known as the Friedel-Crafts reaction. This reaction, as is well known, involves a two-step process wherein the paraffin is chlorinated with chlorine gas, and the alkyl halide thus formed is joined to the aromatic compound by use of a metal halide, such as aluminum chloride.

Several difficulties have been recognized in the performance of the Friedel-Crafts reaction. In the chlorination of paraffins a mixture of mono- and polychlorides is obtained, from which the separation of the desired monochloride is difficult and in some instances is practically impossible. Also, in the chlorination of paraffins, chlorine is irreversibly converted to hydrogen chloride which has no use in the process, and presents a disposal problem. The preparation of alkyl monochlorides by other means, such as by the addition of hydrogen chloride to an olefin, is not feasible, since the alkylating alkyl chloride is required in large quantities, and the preparation of olefins in such a process would constitute an economically prohibitive major step.

An object of the present invention is to provide a process for the alkylation of aromatic hydrocarbons by isoparaffins without the necessity of converting the isoparaffins to chloro-derivatives. A further object is to eliminate the necessity for large quantities of alkyl chlorides as the alkylating agent. Other objects and their achievement in accordance with the present invention will appear hereinafter.

It has now been discovered that alkylatable aromatics can be alkylated with saturated hydrocarbons containing at least one tertiary hydrogen atom per molecule, such as isoparaffins and naphthenes which contain at least one tertiary hydrogen atom per molecule, by subjecting a mixture of such saturated hydrocarbons and an alkylatable aromatic to the simultaneous action of a tertiary chloride and aluminum chloride. According to the invention, when a tertiary chloride and aluminum chloride are brought together in the presence of an alkylatable aromatic hydrocarbon and a tertiary hydrogen-containing saturated isoparaffin or naphthene, a catalytic condition is established which causes rapid alkylation of the aromatics by the isoparaffins or naphthenes.

Thus, the invention provides a one step process whereby aromatics are alkylated directly by isoparaffins, and in which process only relatively small amounts of alkyl chlorides, i. e., catalytic quantities, are required. It is characteristic of the present process that a substantial quantity of the tertiary alkyl chloride employed as a catalytic component is converted to the corresponding paraffin.

By the term, "tertiary chloride," as used herein, is meant the alkyl chlorides wherein the chlorine atom is attached to a tertiary carbon atom, i. e., a carbon atom which in turn is attached to 3 other carbon atoms. As specific examples of tertiary chlorides which may be employed in the present process are: t-butyl chloride, t-amyl chloride, 2-chloro-2,3-dimethylbutane, and other tertiary hexyl chlorides; tertiary heptyl chlorides; and 4-chloro-2,2,4-trimethylpentane and other tertiary octyl chlorides. The catalytic quantities of tertiary chlorides required may advantageously be prepared by the addition of hydrogen chlorides to an olefin corresponding to the desired tertiary chloride, since only relatively small quantities of the chloride are required.

The aromatic hydrocarbons which may be employed in the process of the present invention are the alkylatable aromatics, i. e., those members of the aromatic series which have a substitutable position on the aromatic nucleus. Such aromatics include, for example, benzene, toluene, o-, m-, and p-xylenes, mixtures of xylenes, ethylbenzene, naphthalene, alpha methyl naphthalene, beta methyl naphthalene, diphenyl, the aromatics contained in hydrocarbon fractions, such as straight run fractions, and the like. In general, however, the aromatic to be alkylated should not have more than four substituent groups on the aromatic nucleus.

The saturates which may be employed to alkylate aromatics in accordance with the process of the present invention are iso-paraffins and naphthenes containing at least one tertiary hydrogen atom per molecule, i. e., saturated hydrocarbons which have at least one hydrogen atom attached to a tertiary carbon atom, and which has at least 5, and less than about 30, carbon atoms per molecule. Specific examples of isoparffins which may be employed are isopentane, 2 - methylpentane, 3 - methylpentane, 2 - methylhexane, 3 - methylhexane, 3 - butyldecane, branched chain hexadecanes, heptadecanes, and the like. Specific examples of naphthenes containing a tertiary hydrogen atom which may be employed are those wherein an alkyl group is attached to a carbon atom of the naphthene ring, such as methylcyclopentane, methylcyclohexane, and the ethyl, propyl, and butyl homologs thereof, and the like. By the term, "saturate," as used herein, is intended to include isoparaffins and naphthenes as above described. Dearomatized hydrocarbon fractions containing a substantial proportion of isoparaffins and naphthenes, as above described, may be employed in the present process. Preferably, however, such a fraction should contain at least 25%, and more preferably at least 50%, of tertiary hydrogen-containing isoparaffins and naphthenes. It is further preferred to employ tertiary hydrogen-containing saturates other than those wherein a quaternary carbon atom is in the beta position relative to a tertiary carbon atom, since, as has been found, such saturates tend to form alkyl aromatics wherein the alkyl group contains a smaller number of carbon atoms than the alkylating saturate.

A further preferred embodiment of the present invention is to employ a hydrocarbon fraction, especially a petroleum distillate fraction, such as a straight run fraction, containing both alkylatable aromatics and tertiary hydrogen-containing isoparaffins and naphthenes. By contacting a tertiary alkyl chloride with AlCl₃ in the presence of such a fraction, the isoparaffins and naphthenes therein are caused to alkylate the aromatics present. Additional aromatics or tertiary hydrogen-containing isoparaffins or naphthenes may be added to such a fraction in order to obtain a desired alkylated aromatic product. The added aromatics or tertiary hydrogen-containing isoparaffins and naphthenes may be the same as or different from those originally in the original fraction.

As hereinbefore stated, it is characteristic of the present process that the tertiary chloride employed as a catalytic component is converted to the corresponding paraffin. However, a portion of the alkyl chloride may alkylate the aromatic, especially at relatively low temperatures. This undesired reaction can be suppressed by using a relatively high temperature, as hereinafter defined, and relatively small amounts of the tertiary chloride, also as hereinafter defined. Primary and secondary chlorides, if employed in the present process, alkylate the aromatic to the substantial exclusion of the isoparaffin, and hence primary and secondary chlorides are inoperative in the present process. It is further characteristic of the present process that normal paraffins, i. e., those not having a tertiary hydrogen atom, are inert, and if present act as diluents, but do not deleteriously affect the process.

The quantities of reactants to employ in the present process may be substantially varied and good results obtained therewith. Preferably from 0.25 to 4 moles of tertiary hydrogen-containing isoparaffins or naphthenes is employed for each mole of aromatic, i. e., the mole ratio of saturate to aromatic is preferably from 1:4 to 4:1. It has been found that a large excess of aromatic or saturate, while not adversely affecting the process, does not aid in increasing the yield of alkylated aromatic product. The quantity of tertiary alkyl chloride to employ may advantageously be from 0.05 to 0.6 mole for each mole of aromatics plus saturate, i. e., a mole ratio of tertiary alkyl chloride to aromatics plus saturate of from 1:20 to 3:5, good results being obtained when the ratio is from about 1:5 to 2:5. The quantity of AlCl₃ to employ does not appear critical, only a small amount necessary to initiate the reaction being required. From about 0.05 to 0.5 mole of AlCl₃ per mole of alkyl chloride, i. e., a mole ratio thereof of from 1:20 to 1:2, gives good results and is preferred.

The temperature to employ in the present process should be maintained from about 30° C. to about 80° C., and preferably from 40° C. to 70° C. At lower temperatures catalytic activity of the tertiary chloride-aluminum chloride combination becomes slight, and alkylation with the tertiary chloride becomes relatively greater, while at higher temperatures cracking of the alkyl aromatic product is observed. Atmospheric pressure is advantageously employed, although sub- or super-atmospheric pressures may be advantageous in some instances.

The rate which the catalytic components may be mixed in the present process is largely dependent on the tertiary chloride employed. For example, in a preferred embodiment using t-butyl chloride, isobutane is formed and is evolved as a gas. Hence, the rate of addition of t-butyl chloride to the reaction mixture should be slow enough to permit escape of gas from the apparatus. Where the isoparaffin formed is a liquid under the conditions of reaction, a faster rate of addition may be employed. After mixing of the catalytic components, the reaction mixture should be stirred for from 0.25 to 3 hours, and preferably from 0.5 to 1 hour, to insure complete reaction, but longer or shorter times may be employed with good results.

Olefins and other unsaturated hydrocarbons should be absent from the present reaction mixture, since their presence causes excessive sludge formation and interference with the desired alkylation, namely, the alkylation of an aromatic with a saturated hydrocarbon having at least one tertiary hydrogen atom per molecule.

The following examples illustrate preferred embodiments of the present invention, which is not to be considered as limited thereby:

*Example 1*

A reaction vessel equipped with an agitator, external temperature control means, and a dropping funnel was charged with 84 g. of benzene, 80 g. of 3-methylheptane and 9.5 g. of anhydrous aluminum chloride. 34.5 g. of t-butyl chloride was added dropwise over a period of 45 minutes during stirring, and the reaction mixture stirred for an additional 30 minutes. Isobutane (more than 8.8 g.) and hydrogen chloride were evolved during the reaction.

The aluminum chloride layer was separated and the remaining layer was washed, dried, and the components thereof separated by distillation. The components recovered were as follows:

| | |
|---|---|
| Benzene | g__ 52.6 |
| Octanes | g__ 60.0 |
| t-Butylbenzene | g__ 11.0 |
| Octylbenzenes | g__ 11.5 |
| Residue | g__ 5.0 |

The desired octylbenzene product consisted of a mixture of isomers, each isomer consisting of a benzene ring having a single alkyl substituent of 8 carbon atoms attached thereto. The product boiled between 111.5 and 119.5° C. at 12 mm. of mercury pressure, and had a refractive index $n_D^{25} = 1.4894$.

*Example 2*

A solution of 46 g. of t-butyl chloride in 42 g. of benzene was added over a period of 30 minutes to a stirred suspension of 20 g. of aluminum chloride in 156 g. of benzene and 98 g. of methylcyclohexane, the temperature of the reaction mixture being maintained between 55° C. and 60° C.

Hydrogen chloride and 22 g. of isobutane were evolved during the reaction. The aluminum chloride layer was separated and the remaining layer washed, dried, and separated by distillation into its components, the following being recovered:

| | |
|---|---|
| Benzene _____g__ | 169 |
| Methylcyclohexane _____g__ | 28 |
| Methylcyclohexylbenzenes _____g__ | 29 |
| Residue _____g__ | 5 |

The desired alkylated aromatic product was a mixture of methylcyclohexylbenzenes, such as 1-phenyl-2-methylcyclohexane, 1-phenyl-3-methylcyclohexane, and 1-phenyl-4-methylcyclohexane. The mixture had a boiling range of from 238° C. to 248° C., and a refractive index $n_D^{25}=1.5190$. Substantially no tertiary butyl benzene was formed.

*Example 3*

Following the procedure of Example 1, 46 g. of t-butyl chloride was added dropwise over a 40 minute period to a stirred mixture of 184 g. of toluene, 86 g. of 2-methylpentane and 15 g. of aluminum chloride held at a temperature of from 55-61° C., and the resulting reaction mixture stirred at 60° C. for 35 minutes. After standing for about 2 days, an additional 5 g. of aluminum chloride was added and the reaction mixture reheated to 60-80° C. for 6½ hours. A total of 27.5 cc. of isobutane was collected during the reaction and 7 g. of sludge formed.

The upper layer was separated, washed, dried and distilled. The following were recovered:

| | |
|---|---|
| Toluene _____g__ | 136 |
| 2-methylpentane _____g__ | 48 |
| Hexyltoluenes _____g__ | 27 |

The product, a mixture of isomers of hexyltoluenes, had a boiling range at atmospheric pressure of from 215-239° C., and a refractive index $n_D^{25}=1.496$.

*Example 4*

Sixty-nine grams of t-butyl chloride were added over a 30 minute period to a stirred mixture of 117 g. of benzene, 15 g. of aluminum chloride, and 114 g. of a straight run saturate petroleum fraction having a boiling range of from 87° C. to 120° C. consisting principally of branched chain octanes and a minor proportion of methylcyclohexane, the mixture being held to a temperature of from 52° C. to 56° C. Isobutane was evolved during the reaction.

After sludge separation, the reaction mixture was washed, dried, and separated into its components by distillation. There were recovered 127.9 g. of benzene and saturates, 39 g. of octylbenzene isomers boiling from 230° C. to 270° C. having a refractive index $n_D^{25}=1.5173$, and 3.5 g. of an alkylated benzene boiling from 230° C. to 280° C. having a refractive index $n_D^{25}=1.5337$, probably methylcyclohexylbenzenes. No tertiary butyl benzene was found in the reaction product.

*Example 5*

Using the procedure described for Example 1, 127 g. of n-decane, 100 g. of benzene, and 15 g. of aluminum chloride were charged to a reaction vessel, and 20 g. of t-butyl chloride were added dropwise to the stirred mixture maintained at 55° C. No appreciable amount of isobutane was formed. Increasing the temperature to about 60° C. resulted in a vigorous reaction yielding some isobutane. The reaction mixture was treated as described in Example 1, and the components recovered were benzene, t-butyl benzene, and a widely boiling material containing a negligible quantity of decylbenzene.

When other tertiary alkyl chlorides, e. g., t-amyl chloride and 2,3-dimethyl-2-chlorobutane, other alkylatable aromatics, e. g., toluene and xylene, and other saturates, as hereinbefore described, are employed in the present process, substantially identical results are obtained therewith.

In carrying out the process of the present invention, it is important that the catalytic components, aluminum chloride and a tertiary chloride, be contacted only in the presence of both the aromatic and saturate, or else the catalytic condition will be spent and no such activity thereafter observed. It is preferred to add the tertiary alkyl chloride to a mixture of saturate, aromatic and aluminum chloride, in which case the tertiary chloride may be added per se, or in solution in the saturate or aromatic. However, aluminum chloride may be added to a mixture of tertiary chloride, saturate and aromatic, and good results obtained thereby. Operation of the process may be continuous or batchwise.

The products of the present invention may advantageously be employed in the preparation of detergents, such as by sulfonation and neutralization, for specialized lubrication purposes, and the like.

We claim:

1. Process for the alkylation of toluene with isoparaffin hydrocarbons which comprises reacting, at a temperature of from 40° C. to 70° C. and at substantially atmospheric pressure, toluene with an isoparaffin having at least five carbon atoms and one tertiary hydrogen atom per molecule in the presence of a catalyst comprising an admixture of tertiary butyl chloride and AlCl₃, said admixture having been prepared by bringing together said tertiary chloride and said AlCl₃ in the presence of said aromatic and said isoparaffin, and recovering an alkylated aromatic having an alkyl group containing the same number of carbon atoms as said saturate hydrocarbon reactant.

2. Process for the alkylation of xylene with isoparaffin hydrocarbons which comprises reacting, at a temperature of from 40° C. to 70° C. and at substantially atmospheric pressure, xylene with an isoparaffin having at least five carbon atoms and one tertiary hydrogen atom per molecule in the presence of a catalyst comprising an admixture of tertiary butyl chloride and AlCl₃, said admixture having been prepared by bringing together said tertiary chloride and said AlCl₃ in the presence of said aromatic and said isoparaffin, and recovering an alkylated aromatic having an alkyl group containing the same number of carbon atoms as said saturated hydrocarbon reactant.

3. Process for the alkylation of alkylatable aromatic hydrocarbons with isoparaffin hydrocarbons which comprises reacting, at a temperature of from about 30° C. to about 80° C., an alkylatable aromatic hydrocarbon with an isoparaffin hydrocarbon having at least 5 carbon atoms and one tertiary hydrogen atom per molecule in the presence of a catalyst comprising an admixture of a tertiary alkyl mono-chloride and AlCl₃, said admixture having been prepared by bringing together said tertiary alkyl mono-chloride and said AlCl₃ in the presence of said aromatic and said isoparaffin, said tertiary alkyl mono-chloride having a different number of carbon atoms from said isoparaffin, thereby forming an alkylated aromatic having an alkyl group containing the same number of carbon atoms as said isoparaffin.

4. Process according to claim 3 wherein the alkylatable aromatic hydrocarbon is benzene.

5. Process according to claim 3 wherein the alkylatable aromatic hydrocarbon is toluene.

6. Process according to claim 3 wherein the alkylatable aromatic hydrocarbon is xylene.

7. Process for the alkylation of aromatic hydrocarbons with isoparaffin hydrocarbons which comprises reacting, at a temperature of from 40° C. to 70° C. and at substantially atmospheric pressure, an alkylatable aromatic hydrocarbon with an isoparaffin having at least five carbon atoms and one tertiary hydrogen atom per molecule in the presence of a catalyst comprising an admixture of tertiary amyl chloride and AlCl₃, said admixture having been prepared by bringing together said tertiary amyl chloride and said AlCl₃ in the presence of said aromatic and said isoparaffin, said tertiary amyl chloride having a different number of carbon atoms from said isoparaffin, and recovering an alkylated aromatic having an alkyl group containing the same number of carbon atoms as said isoparaffin.

8. Process according to claim 7 wherein the alkylatable aromatic hydrocarbon is benzene.

9. Process according to claim 7 wherein the alkylatable aromatic hydrocarbon is toluene.

10. Process according to claim 7 wherein the alkylatable aromatic hydrocarbon is xylene.

11. Process for the alkylation of aromatic hydrocarbons with isoparaffin hydrocarbons which comprises reacting, at a temperature of from 40° C. to 70° C. and at substantially atmospheric pressure, an alklatable aromatic hydrocarbon with an isoparaffin having at least five carbon atoms and one tertiary hydrogen atom per molecule in the presence of a catalyst comprising an admixture of 2,3-dimethyl-2-chlorobutane and AlCl₃, said admixture having been prepared by bringing together said 2,3-dimethyl-2-chlorobutane and said AlCl₃ in the presence of said aromatic and said isoparaffin, said 2,3-dimethyl-2-chlorobutane having a different number of carbon atoms from said isoparaffin, and recovering an alkylated aromatic having an alkyl group containing the same number of carbon atoms as said isoparaffin.

12. Process according to claim 11 wherein the alkylatable aromatic hydrocarbon is benzene.

13. Process according to claim 11 wherein the alkylatable aromatic hydrocarbon is toluene.

14. Process according to claim 11 wherein the alkylatable aromatic hydrocarbon is xylene.

15. Process for the alkylation of benzene with isoparaffin hydrocarbons which comprises reacting, at a temperature of from 40° C. to 70° C. and at substantially atmospheric pressure, benzene with an isoparaffin having at least five carbon atoms and one tertiary hydrogen atom per molecule in the presence of a catalyst comprising an admixture of tertiary butyl chloride and AlCl₃, said admixture having been prepared by bringing together said tertiary chloride and said AlCl₃ in the presence of said aromatic and said isoparaffin, and recovering an alkylated aromatic having an alkyl group containing the same number of carbon atoms as said saturate hydrocarbon reactant.

ROBERT M. KENNEDY.
ABRAHAM SCHNEIDER.

References Cited in the file of this patent

UNITED STATES PATENTS

| Number | Name | Date |
|---|---|---|
| 2,009,108 | Egloff | July 23, 1935 |
| 2,088,598 | Ipatieff et al. | Aug. 3, 1937 |
| 2,104,424 | Ipatieff et al. | Jan. 4, 1938 |
| 2,361,065 | Schmerling et al. | Oct. 24, 1944 |
| 2,379,368 | Matuszak | June 26, 1945 |
| 2,433,020 | Becker | Dec. 23, 1947 |

OTHER REFERENCES

Gossin: Bull. Soc. Chim. de Paris, new series, vol. 41 (1884), pp. 446–7 (2 pp.).

Berry et al.: Jour. Amer. Chem. Soc., vol. 49 (December 1927), pp. 3142–49 (8 pp.).

Adams et al.: "Organic Reactions," vol. III (1946), pp. 33, 81 (2 pp.).

Condon et al.: Jour. Amer. Chem. Soc., vol. 70 (July 1948), pp. 2539–42 (4 pp.).